United States Patent
Nakagiri et al.

(10) Patent No.: US 7,031,001 B2
(45) Date of Patent: Apr. 18, 2006

(54) PRINT CONTROL APPARATUS AND CONTROL METHOD

(75) Inventors: Koji Nakagiri, Kanagawa (JP); Satoshi Nishikawa, Kanagawa (JP); Yasuo Mori, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 800 days.

(21) Appl. No.: 09/912,553

(22) Filed: Jul. 26, 2001

(65) Prior Publication Data
US 2002/0016799 A1 Feb. 7, 2002

(30) Foreign Application Priority Data
Jul. 31, 2000 (JP) ............................. 2000-232088
Sep. 4, 2000 (JP) ............................. 2000-267393

(51) Int. Cl.
*G06F 15/00* (2006.01)
*G06F 13/00* (2006.01)

(52) U.S. Cl. ..................... 358/1.1; 358/1.18; 399/16; 399/193; 399/362; 399/408; 270/7; 270/9; 270/12; 270/44; 270/45

(58) Field of Classification Search ............. 358/1.18, 358/1.1, 1.15; 399/362; 270/7, 9, 11, 12, 270/44, 37, 52.18, 52.26; 412/2.11

See application file for complete search history.

(56) References Cited

U.S. PATENT DOCUMENTS

| 4,218,130 | A | * | 8/1980 | Satomi et al. .............. 399/362 |
| 5,119,206 | A | * | 6/1992 | Rourke et al. .............. 358/296 |
| 5,592,280 | A | * | 1/1997 | Ishizuka et al. ............ 399/410 |
| 5,600,429 | A | * | 2/1997 | Kutsuwada ................... 399/17 |
| 5,897,251 | A | * | 4/1999 | Kato et al. .................. 399/408 |
| 6,502,614 | B1 | * | 1/2003 | King et al. .................. 156/384 |
| 6,507,858 | B1 | * | 1/2003 | Kanerva et al. ............. 715/515 |
| 6,509,977 | B1 | * | 1/2003 | Kujirai et al. ............. 358/1.18 |
| 6,827,514 | B1 | * | 12/2004 | Shima ......................... 400/582 |
| 2002/0097407 | A1 | * | 7/2002 | Ryan et al. .................. 358/1.1 |

FOREIGN PATENT DOCUMENTS

JP 11-348371 12/1999

\* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

A print control apparatus and a print control method perform optimum page layout processing in accordance with properties of output apparatus capable of book bind printing. The order of sheets and the order of sides are obtained as book bind print setting information from the type of printer capable of book bind printing or paper discharge orifice or the type of finisher, then based on the obtained setting information, the page layout upon book bind printing is determined, and print data transmitted to the output apparatus is generated in accordance with the determined page layout.

21 Claims, 15 Drawing Sheets

| | | |
|---|---|---|
| SIDE-ORDER SETTING INFORMATION | (0 : FROM INSIDE / 1 : FROM OUTSIDE) | ~601 |
| SHEET-ORDER SETTING INFORMATION | (0 : FROM INSIDE / 1 : FROM OUTSIDE) | ~602 |
| BINDING SETTING INFORMATION | (0 : BIND AS ONE PRINTED MATERIAL / N : BIND BY N SHEETS) | ~603 |
| BATCH-ORDER SETTING INFORMATION | (0 : ASCENDING ORDER / 1 : DESCENDING ORDER) | ~604 |
| OPENING DIRECTION SETTING INFORMATION | (0 : LEFTWARD (UPWARD) / 1 : RIGHTWARD (DOWNWARD)) | ~605 |

FIG. 15A
PAGE LAID OUT ON K-TH SHEET FROM OUTSIDE OF DOCUMENT
 a : Ps−1+(K×2−1)
 b : Ps−1+(K×2)
 c : Ps−1+(D×4+1−(K×2−1))
 d : Ps−1+(D×4+1−(K×2))
PRINT a AND c, b AND d ON THE SAME SIDE
b IS BACK OF a, d IS BACK OF c
FIG. 15B
FIRST SIDE   SECOND SIDE
TYPE 1/ TYPE 3 LEFTWARD
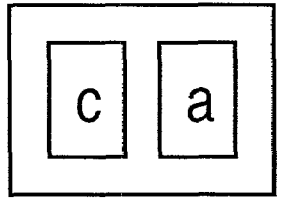 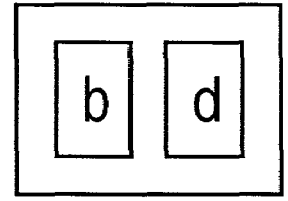
TYPE 1/ TYPE 3 RIGHTWARD
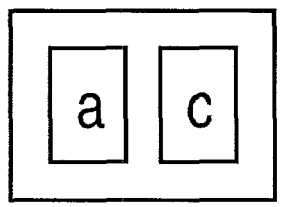 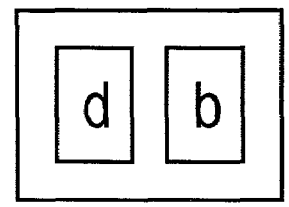
TYPE 2/ TYPE 4 LEFTWARD
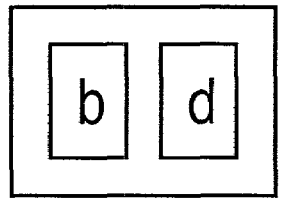 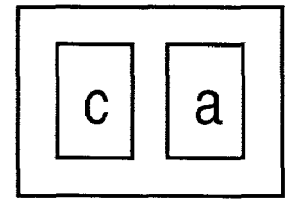
TYPE 1/ TYPE 3 RIGHTWARD
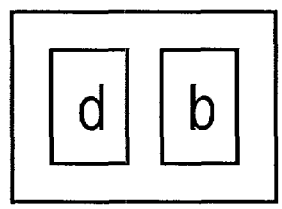

PRINT CONTROL APPARATUS AND CONTROL METHOD

FIELD OF THE INVENTION

The present invention relates to a print control apparatus and a control method for controlling printing in an output apparatus capable of book bind printing and a storage medium.

BACKGROUND OF THE INVENTION

Conventionally, in a system having an information processing apparatus such as a personal computer and an output apparatus such as a printer, book bind printing is made by temporarily spooling data of all the pages in the printer then laying out pages and book bind print-outputting the data. However, in the conventional method, if the printer lacks spooling and page layout functions, the book bind printing cannot be performed. Accordingly, book bind printing is performed by laying out the pages on the information processing apparatus side, then transferring the data to the printer with designation of double-sided printing.

In the conventional method, as the printing is performed by the printer as simple double-sided printing, an undesirable output result may be obtained in accordance with printer properties (double-sided printing, finisher property such as saddle stitching, paper-discharge property and the like).

For example, in a printer having a finisher capable of saddle stitching and two-folding, saddle stitching must be performed inward from the outside, however, on the information processing apparatus side, it is impossible to lay out pages in correspondence with the finisher property.

Further, in a printer with plural paper discharge orifices of different properties, when a paper discharge orifice is changed, an unexpected output result may be obtained.

Further, in the conventional method, as the printing is performed by the printer as simple double-sided printing, there is no problem in use of printer driver specialized for a particular printer. However, in recent years, in use of common printer driver available to plural printers of the same series (printer driver including a device-dependent driver portion to provide a user interface for print settings and the like, and a common printer driver portion for generation of page description language), an undesirable output result may be obtained in accordance with printer properties (double-sided printing, finisher property such as saddle stitching, paper-discharge property and the like).

For example, when one bound printed material is obtained by printing by plural batches of documents upon book bind printing, and binding the print-output plural batches to one bound printed material, occasionally the pages of stacked plural batches of documents as shown in FIG. 11 are not arranged in ascending order in accordance with the printer properties (double-sided printing, finisher property such as saddle stitching, paper-discharge property and the like) and/or the opening direction of batch document. In such case, a user has to manually rearrange the pages.

SUMMARY OF THE INVENTION

The present invention has been made in consideration of the above problems, and has its object to provide a print control apparatus and a control method for optimum page layout processing for book bind printing in accordance with properties of output apparatus capable of book bind printing.

To attain the above object, according to one aspect of the present invention, provided is a print control apparatus for controlling printing by an output apparatus capable of book bind printing, comprising: setting information acquisition means for acquiring setting information of the book bind printing in correspondence with properties of the output apparatus capable of book bind printing; and page layout determination means for determining a page layout upon the book bind printing based on the setting information of the book bind printing.

Further, the present invention has an object to provide a print control apparatus and a control method for optimum page layout processing in book bind printing in correspondence with settings of properties of output apparatus capable of book bind printing and opening direction of batch document, thereby laying out pages of plural batch documents in ascending order such that a final bound printed material can be obtained without changing the direction of each outputted batch document.

Further, to attain the above object, according to another aspect of the present invention, provided is a print control apparatus for generating print data to be print-outputted by an output apparatus, comprising: layout control means for, if book bind printing to discharge plural batch documents from the output apparatus is required, controlling layout of each page to arrange pages in consecutive page numbers for each batch document; and transmission order control means for, if book bind printing to discharge plural batch documents from the output apparatus is required, controlling the order of transmission of print data by each batch document.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is an example of a user interface of a printer driver 203 for setting book bind printing;

FIG. 6 is a schematic diagram showing setting information regarding book bind printing, stored in a spool file 303;

FIGS. 15A and 15B are an example of setting of page layout and an explanatory view of pages arranged on paper.

DETAILED DESCRIPTION OF THE PREFERRED EMBODIMENT

A preferred embodiment of the present invention will now be described in detail in accordance with the accompanying drawings.

First, prior to the explanation of present embodiment, description will be made on the configuration of system having a printer to which the present invention is applicable and an information processing apparatus such as a personal computer connected to the printer, especially, a printing system having a spooler as spooling means for temporarily holding data, used for generation of print data to be transmitted to a printer, in data format different from that of print data (so-called intermediate code), a despooler as despooling means for generating print data finally transmitted to the printer from the temporarily held data in the intermediate code format, and a printer driver as means for generating a printer control command.

Figure 1:
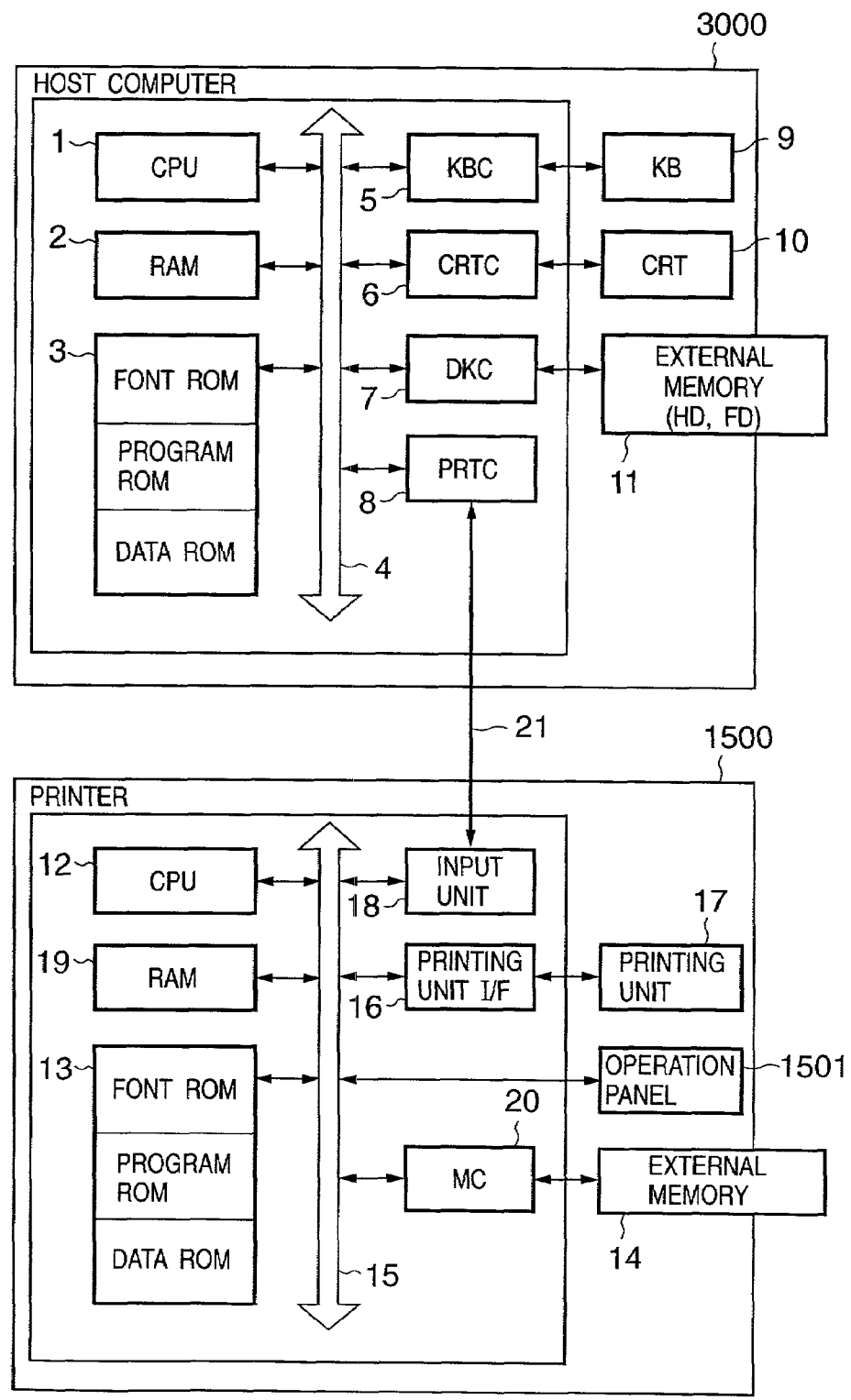
FIG. 1 is a block diagram showing the configuration of a printer control system according to an embodiment of the present invention.

FIG. 1 is a block diagram showing the configuration of a printer control system in the present embodiment. As shown in FIG. 1, the printer control system has a host computer 3000 and a printer 1500. The host computer 3000 is an example of the print control apparatus of the present invention which performs optimum page layout processing on print data in accordance with properties of printing apparatus to which the print data is outputted, as described later. Further, the printer 1500 performs print output processing on the print data generated by the host computer 3000 as the print control apparatus. The printer 1500 has a function to discharge plural batch documents in book bind printing.

Note that as long as the functions of the present invention are realized, the present invention is applicable to a single device, a system having plural devices, and a system where connection and processing are performed via a network such as LAN or WAN.

The host computer 3000 in FIG. 1 has a CPU 1 which performs document processing on a document including a figure, an image, characters, a table (spreadsheet calculation is included) and the like, based on a document processing program stored in a program ROM in an ROM 3 or an external memory (HD or FD) 11. The CPU 1 controls the respective devices connected to a system bus 4. Further, an operating system (hereinbelow "OS") as a control program of the CPU 1, and the like, are stored in the program ROM in the ROM 3 and the external memory 11. Further, font data and the like used in document processing are stored in a font ROM in the ROM 3 and the external memory 11, and various data used in the document processing and the like are stored in a data ROM in the ROM 3 and the external memory 11. A RAM 2 functions as a main memory of the CPU 1, a work area or the like. Further, a print control program of the present invention includes plural program modules respectively stored (installed) in the program ROM or the external memory. The present invention is realized by reading the print control program to the RAM 2 upon generation of print data, and performing the respective function processings by the CPU 1 based on the read program modules.

Further, in the host computer 3000, numeral 5 denotes a keyboard controller (KBC) which controls inputs from a keyboard 9 and a pointing device (not shown); 6, a CRT controller (CRTC) which controls display on a CRT display (CRT) 10; 7, a disk controller (DKC) which controls access to the external memory 11 of a hard disk (HD), a floppy disk (FD) or the like holding a boot program, various application programs, font data, a user file, an editing file, a printer control command generation program (hereinafter "printer driver") and the like; and 8, a printer controller (PRTC) which performs communication control processing for communication with the printer 1500 connected to the host computer via a bidirectional interface (interface) 21.

Note that the CPU 1 performs processing to rasterize outline font in a display information area of e.g. the RAM 2, thus realizing WYSIWYG on the CRT 10. Further, the CPU 1 opens various registered windows based on commands designated by a mouse cursor (not shown) on the CRT 10, and performs various data processings. When a user performs printing, the user opens a window related to print settings, to change settings of the printer and print processing method including a print mode selection for a printer driver.

On the other hand, in the printer 1500, numeral 12 denotes a printer CPU which outputs an image signal as output information to a printing unit (printer engine) 17 connected to a system bus 15, based on a control program or the like stored in a program ROM in a ROM 13 or a control program or the like stored in an external memory 14. A control program for the CPU 12 and the like are stored in the program ROM in the ROM 13. Font data used upon generation of output information, and the like, are stored in a font ROM in the ROM 13. In a case where the printer lacks the external memory 14 such as a hard disk, information and the like used on the host computer are stored in a data ROM in the ROM 13.

Further, the CPU 12, capable of performing communication processing for communication with the host computer 3000 via an input unit 18, notifies the host computer 3000 of information or the like in the printer 1500. A RAM 19 functions as a main memory of the CPU 12 or a work area. The memory capacity of the RAM 19 can be expanded by an option RAM connected to an add-on port (not shown).

Note that the RAM 19 is used as an output information layout area, an environment data storage area, an NVRAM or the like. The above-described external memory 14 such as a hard disk (HD) or an IC card is access-controlled by a memory controller (MC) 20. The external memory 14 is connected to the printer as an option memory, and used for storing font data, emulation programs, form data and the like. Further, an operation panel 1501 is constructed with operation switches, LED display device and the like.

Further, the number of above-described external memory 14 is not limited to one, but it may be arranged such that plural external memories holding option cards, programs for interpreting printer control languages of different language systems as well as internal font, may be connected to the printer. Further, an NVRAM (not shown) may be provided for storing printer mode setting information from the operation panel 1501.

Next, a typical print processing performed in a host computer, directly connected or connected via a network, to a printing apparatus such as a printer, will be described.

Figure 2:
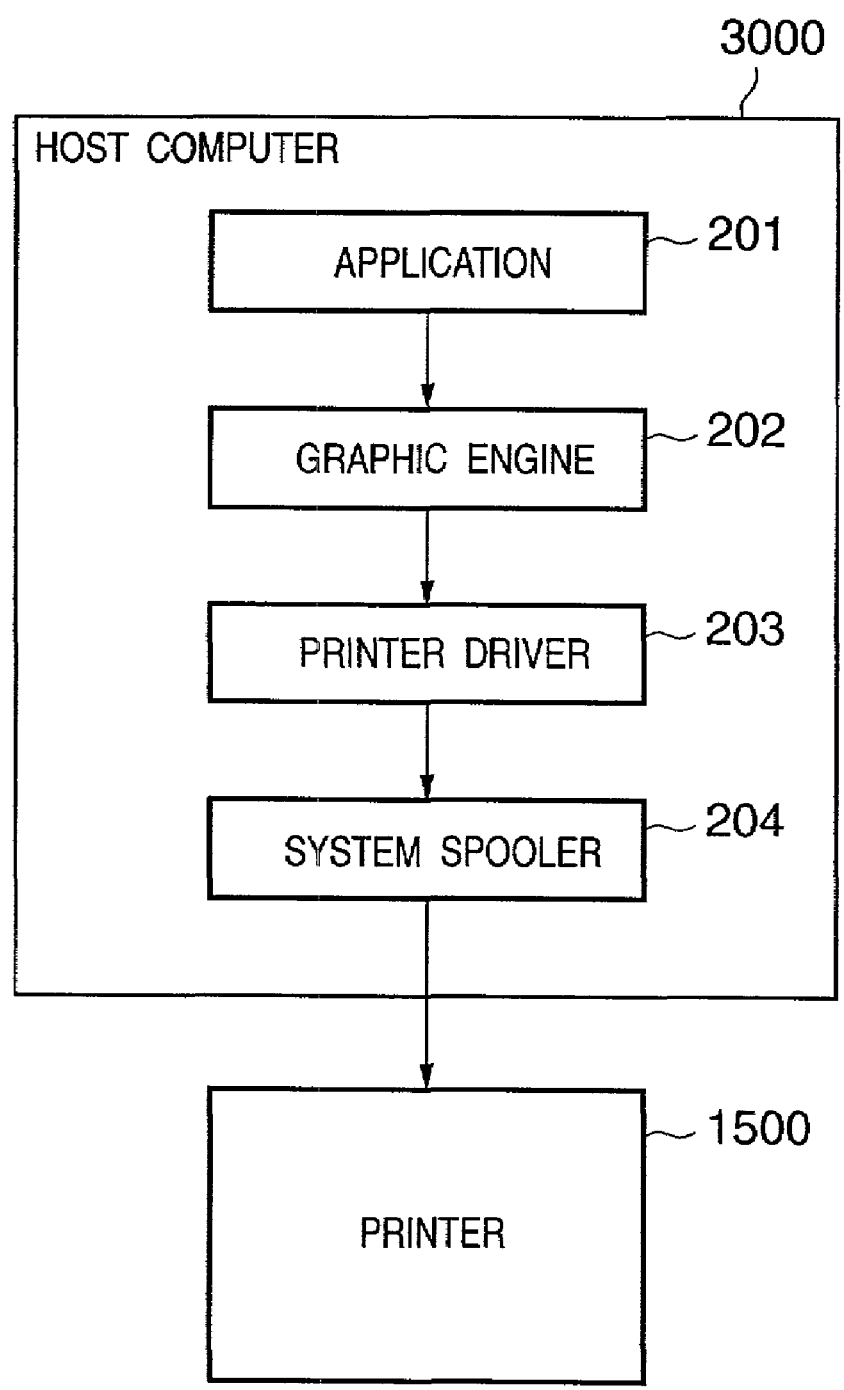
FIG. 2 is a block diagram showing print processing performed by a host computer 3000.

FIG. 2 is a block diagram showing print processing performed by a host computer 3000. In FIG. 2, an application 201, a graphic engine 202, a printer driver 203 and a system spooler 203 are program modules which exist as files stored in the external memory 11. Upon execution of these modules, they are loaded into the RAM 2 by the OS or a module to use them. The application 201 and the printer driver 203 may be additionally stored in the HD of the external memory 11 via the FD of the external memory 11, a CD-ROM (not shown) or a network (not shown).

First, the application 201 stored in the external memory 11 is loaded into the RAM 2 and executed. When printing performed by the application 201 using the printer 1500 is designated by the keyboard 9 or the mouse (not shown), the graphic engine 202, similarly loaded into the RAM 2 for execution is utilized to perform output (drawing).

The graphic engine 202 loads the printer driver 203 prepared for each printing apparatus from the external memory 11, and sets the destination of output from the application 201 to the printer driver 203. Then, the graphic engine converts a GDI (Graphic Device Interface) function received from the application 201 into a DDI (Device Driver Interface) function and outputs the DDI function to the printer driver 203.

The printer driver 203 converts the DDI function received from the graphic engine 202 into a control command recognizable for the printer 1500, e.g., PDL (Page Description Language). The converted printer control command is delivered to the system spooler 204 loaded by the OS into the RAM 2, and outputted as print data to the printer 1500 via the interface 21.

Next, the printing system according to the present embodiment will be described. In addition to the printing system having the printer and the host computer as shown in FIG. 2, the present embodiment has a construction to temporarily spool print data from an application as intermediate code data, as shown in FIG. 3.

Figure 3:
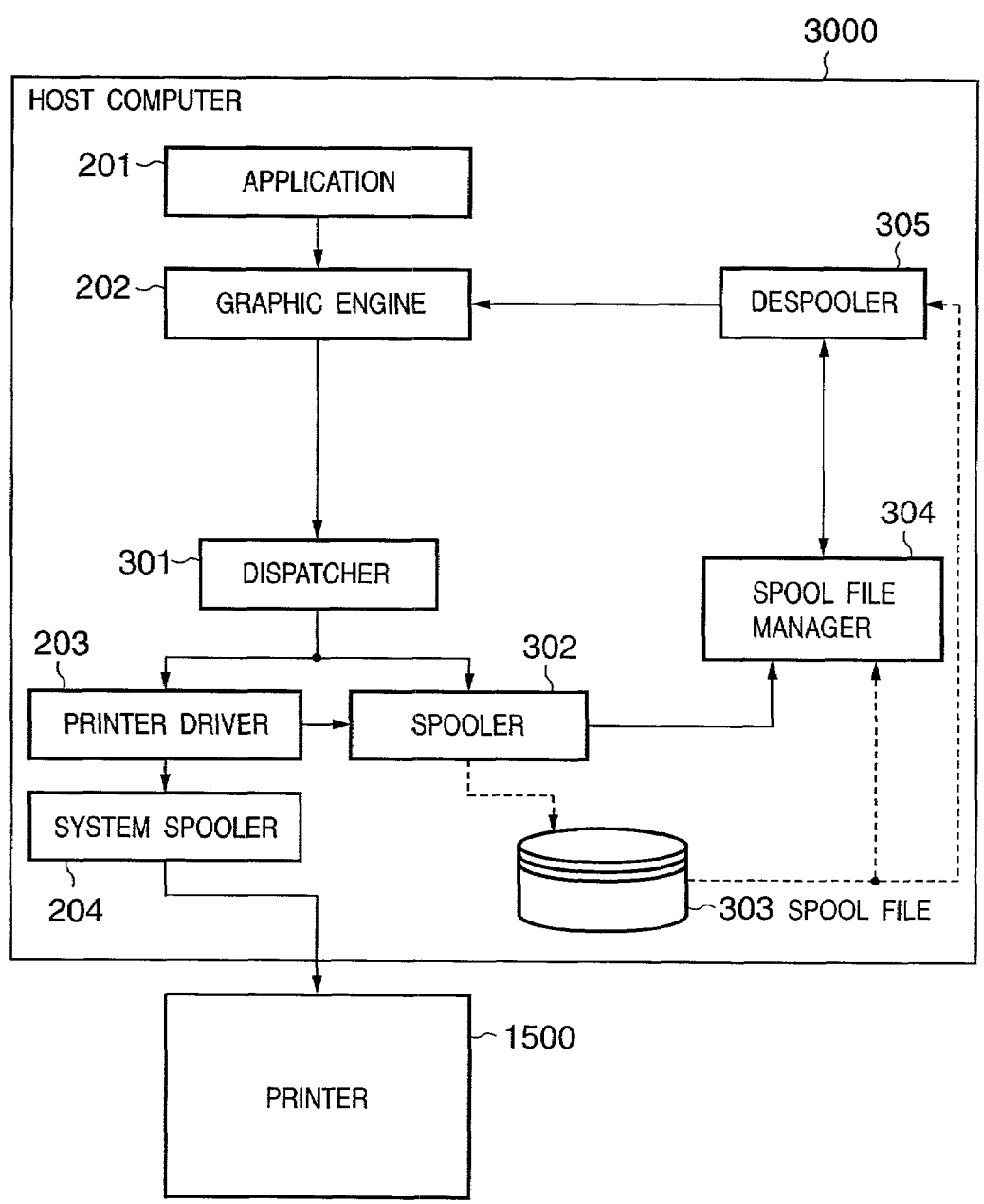
FIG. 3 is a block diagram showing a construction where a print command from an application program is temporarily spooled as intermediate code data.

FIG. 3 shows a construction expanded from the system in FIG. 2, in which when the graphic engine 202 sends a print command to the printer driver 203, a spool file 303 of intermediate code is temporarily generated.

In the system in FIG. 2, when the printer driver 203 has converted all the print commands from the graphic engine 202 into printer control commands, the application 201 is released from print processing.

On the other hand, in the system in FIG. 3, the application 201 is released from print processing when the spooler 302 has converted all the print commands into intermediate code data and outputted them to the spool file 303. That is, according to the system in FIG. 3, the application 201 can be released from the print processing in a short period. Further, in the system in FIG. 3, the contents in the spool file 303 may be processed. Accordingly, the system can realize functions not provided by the application, e.g., printing an enlarged or reduced image from print data from the application, and printing plural images in one page, based on the print data.

In this manner, in the system in FIG. 3 expanded from the system in FIG. 2, the print commands are spooled as intermediate code data. Note that for processing print data, generally, settings are made from a window provided by the printer driver 203, and the settings are stored by the printer driver 203 on the RAM 2 or the external memory 11.

Next, the print processing in the system in FIG. 3 will be described in detail. As shown in FIG. 3, in the expanded processing system, the DDI function, which is a print command from the graphic engine 202, is received by a dispatcher 301. If the print command (DDI function) received from the graphic engine 202 is based on a print command issued from the application 201 to the graphic engine 202 (GDI function), the dispatcher 301 loads the spooler 302 from the external memory 11 into the RAM 2, and sends the print command (DDI function) not to the printer driver 203 but to the spooler 302.

The spooler 302 interprets the received print command, converts it into intermediate code in page units, and outputs the code to the spool file 303. The spool file of intermediate code stored in page units is called a page description file (PDF). Further, the spooler 302 obtains process settings (book bind printing, Nup, double-sided, stapling, color/monochrome etc.) regarding the print data, set for the printer driver 203, from the printer driver 203, and stores the settings as a job-unit file in the spool file 303. At this time, the setting file stored in job units is called a job setting file (simply, SDF: Spool Description File). The job setting file will be described later.

Note that the spool file 303 is generated on the external memory 11 as a file, however, it may be generated on the RAM 2. Further, the spooler 302 loads a spool file manager 304 from the external memory 11 into the RAM 2, and notifies the spool file manager 304 of the status of generation of the spool file 303. Then the spool file manager 304 determines whether or not printing can be performed in accordance with the contents of process settings regarding the print data stored in the spool file 303.

If the spool file manager 304 determines that printing can be performed by utilizing the graphic engine 202, the spool file manager loads a despooler 305 from the external memory 11 into the RAM 2, and instructs the despooler 305 to perform print processing on the page description file of the intermediate code described in the spool file 303. The despooler 305 processes the page description file in intermediate code included in the spool file 303 in accordance with the job setting file including the process setting information included in the spool file 303, regenerates the GDI function, and outputs the GDI function again via the graphic engine 202.

On the other hand, if the print command (DDI function) received from the graphic engine 202 is based on the print command (GDI function) issued from the despooler 305 to the graphic engine 202, the dispatcher 301 sends the print command not to the spooler 302 but to the printer driver 203. The printer driver 203 generates a printer control command in page description language based on the DDI function obtained from the graphic engine 202, and outputs the command via the system spooler 204 to the printer 1500.

Next, processing to designate the above-described process settings (book bind printing, Nup, double-sided, stapling, color/monochrome etc.) regarding print data will be described.

Figure 4:
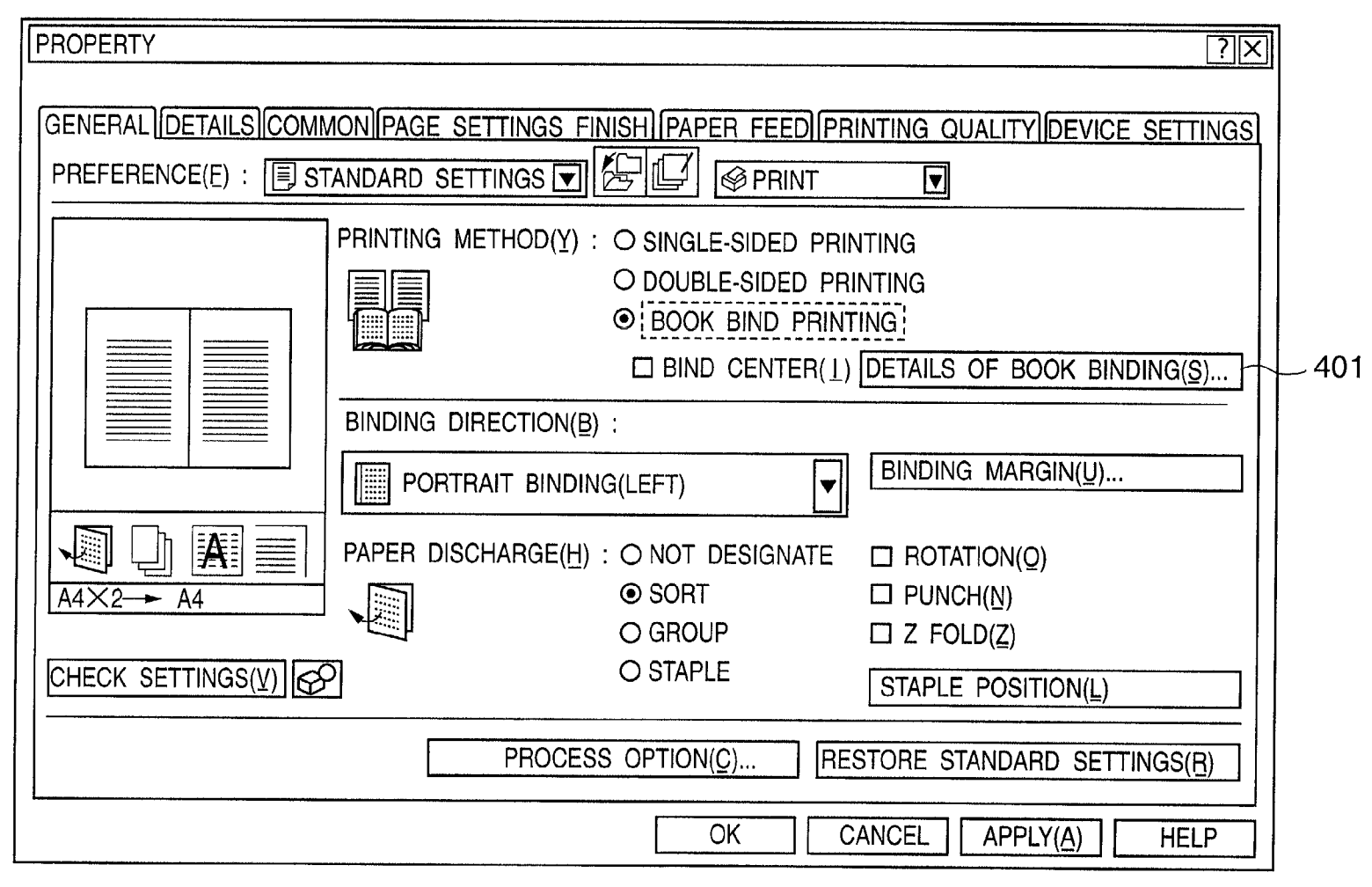
Figure 5A:
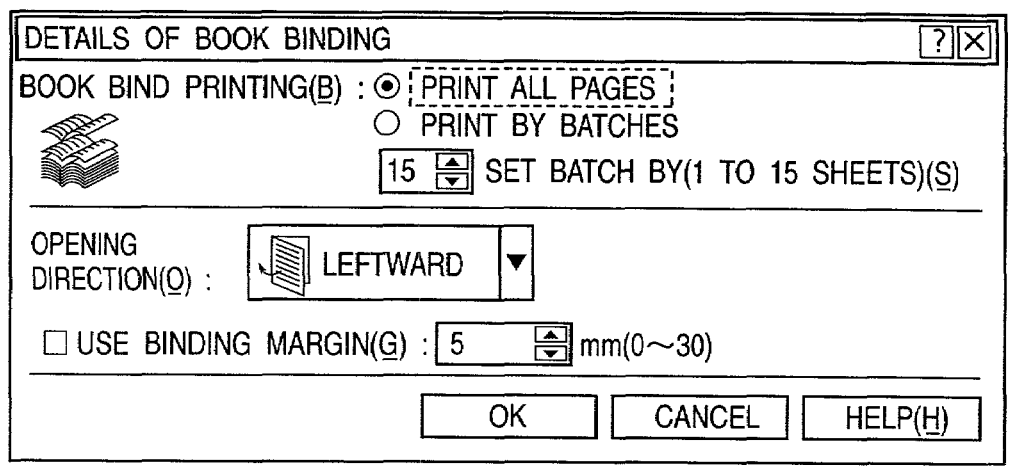
FIGS. 5A and 5B are examples of the user interface for user to designate book bind setting.
Figure 5B:
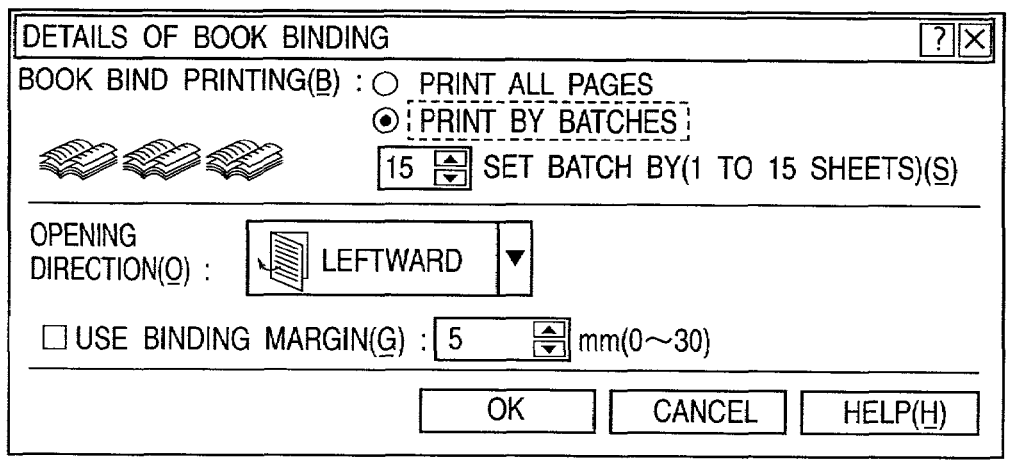

FIG. 4 is an example of user interface of a printer driver 203 for setting book bind printing. In the example, as a printing method, one of single-sided printing, double-sided printing, book bind printing is selected. The book bind printing is laying out reduced 2 pages on each side, i.e., total 4 pages on respective sides of one sheet, and binding output results and folding them, into a form of book. Further, if a button "details of book binding" 401 is depressed, a user interface as shown in FIGS. 5A and 5B is displayed. The user interface in FIGS. 5A and 5B will be described later.

FIG. 6 is a schematic diagram showing setting information regarding book bind printing, stored in a spool file 303. As shown in FIG. 6, in the present embodiment, at least side-order setting information 601, sheet-order setting information 602, binding setting information 603, batch-order setting information 604, and opening direction setting information 605 are stored as setting information related to book bind printing.

First, the binding setting information 603 is a "binding setting" parameter to designate whether an input document is finished as one bound printed material or plural batch documents. Hereinafter, book bind printing to provide plural batch documents will be referred to as batch binding. Upon batch binding, the number of sheets forming each batch is stored. This parameter is set to 0 or greater integer value. If the parameter is set to 0, the input document is to be finished as one bound printed material.

Note that in book bind printing, a finisher which performs saddle stitching or two-folding can be utilized, however, the number of sheets that can be bound as one batch document is limited due to physical limitations of saddle stitching, two-folding and paper-discharge orifice and the like. For example, in a recent product, saddle stitch processing can be performed on up to 15 sheets, and up to double-sided 60 pages (logical pages) can be printed as one batch document.

Further, in case of book bind printing a document having a large total number of pages (for example, stitching cannot be physically performed on a document having 61 or more pages due to the above reason. Further, batch binding can be designated for a document having 60 or less pages.), it is necessary to perform book bind printing plural times, and further bind obtained plural batch documents to one bound printed material. That is, the printer driver 203 controls the number of sheets constructing a batch document by setting the "binding setting" parameter to an appropriate value.

FIGS. 5A and 5B are examples of user interface for a user to designate batch binding setting. The user interface is started by the printer driver by selection of the button "details of book binding" in the field of printing method in FIG. 4. FIG. 5A shows the designation of book bind printing to finish an input document as one bound printed material. In this case, the value of the "binding setting" parameter is 0. FIG. 5B shows the designation of book bind printing to obtain plural batch documents. In this case, the value of the "binding setting" parameter is a value (15 in FIG. 5A) designated by the user interface. Further, as shown in FIG. 5A, the number of sheets of each batch document can be limited by limitation of finisher. In this example, the upper limit of the number of sheets is 15.

Figure 7:
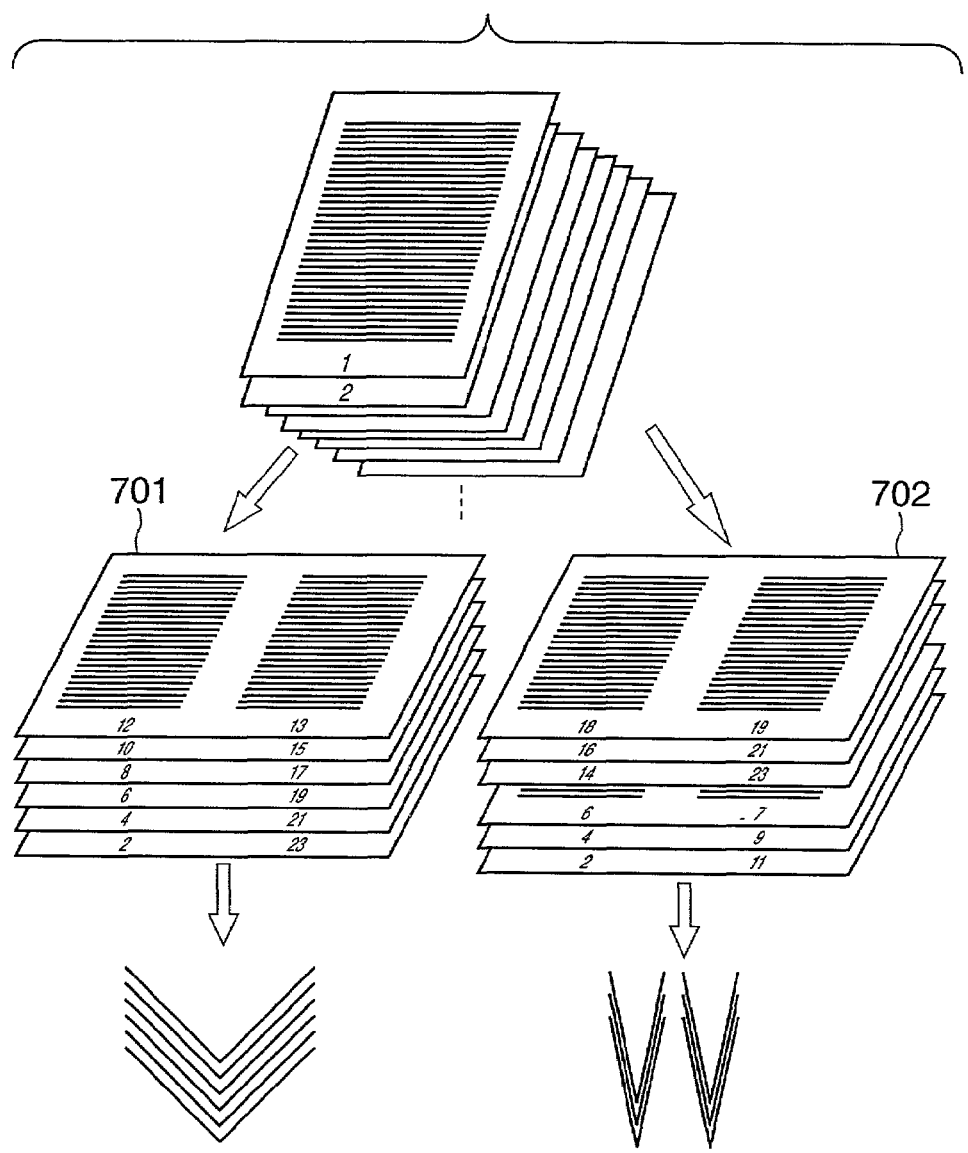
FIG. 7 is an explanatory view of output results of printing based on binding setting.

FIG. 7 is an explanatory view of output results by the "binding setting". In FIG. 7, 701 shows an example of book binding by printing 24 pages of original on 6 sheets and binding them into one bound printed material, while 702, an example of book binding by printing the 24 pages of original on respective 3 sheets (12 pages) of two batch documents, and binding the two batch documents to a final bound printed material.

Next, the opening direction setting information 605 in FIG. 6 is a "opening direction setting" parameter to designate leftward-opening (upward-opening) book binding or rightward-opening (downward-opening) book binding.

Figure 8:
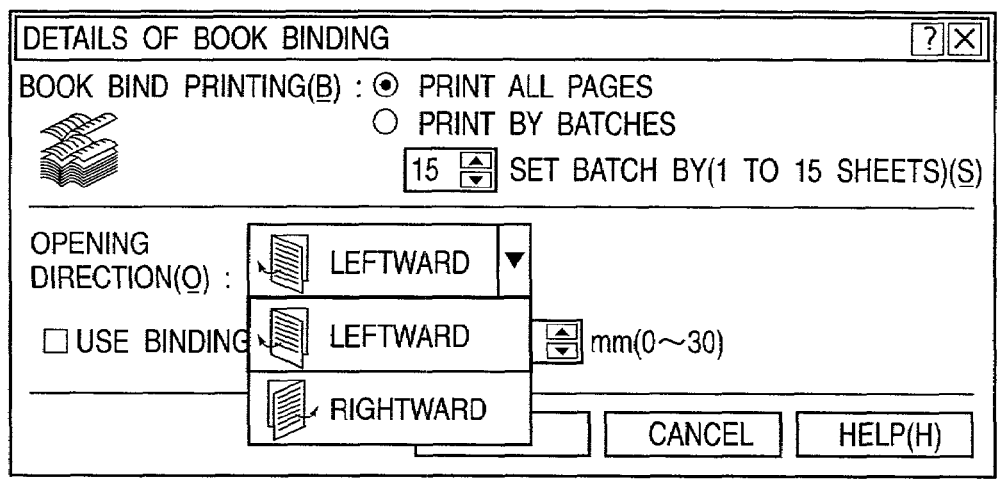
FIG. 8 is an example of the user interface for the user to set an opening direction.

FIG. 8 is an example of the user interface for the user to set the opening direction. As shown in the figure, the "opening direction setting" can be designated independently of the "binding setting".

Note that if an input document is a landscape type document, usually upward-opening (leftward-opening) is used, however, downward-opening (rightward-opening) can be selected by processing similar to the above-described selection. In the present embodiment, the original is a portrait type document, however, the invention is applicable to a landscape type original document. Further, if a language which does not require designation of opening direction is used, it may be arranged such that the opening is always internally set to e.g. leftward-opening without user's setting.

Next, the sheet-order setting information 602 and the side-order setting information 601 in FIG. 6 are parameters to designate the order of data transfer to the printer. In this embodiment, the "sheet-order setting" and "side-order setting" parameters will be described in the case where data as shown in FIG. 9 is transmitted from the information processing apparatus to the printer.

Figure 9:
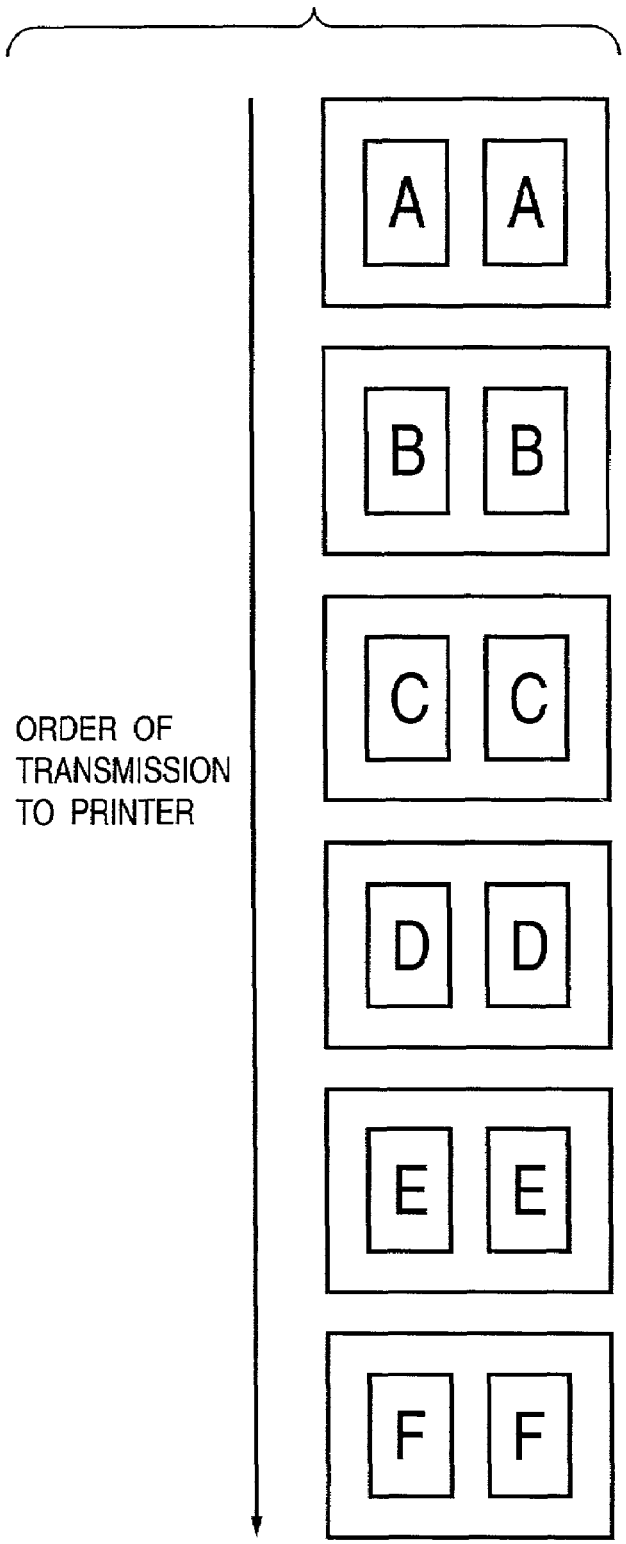
FIG. 9 is a schematic diagram showing an example of data transmitted to the printer upon book bind printing.
Figure 10:
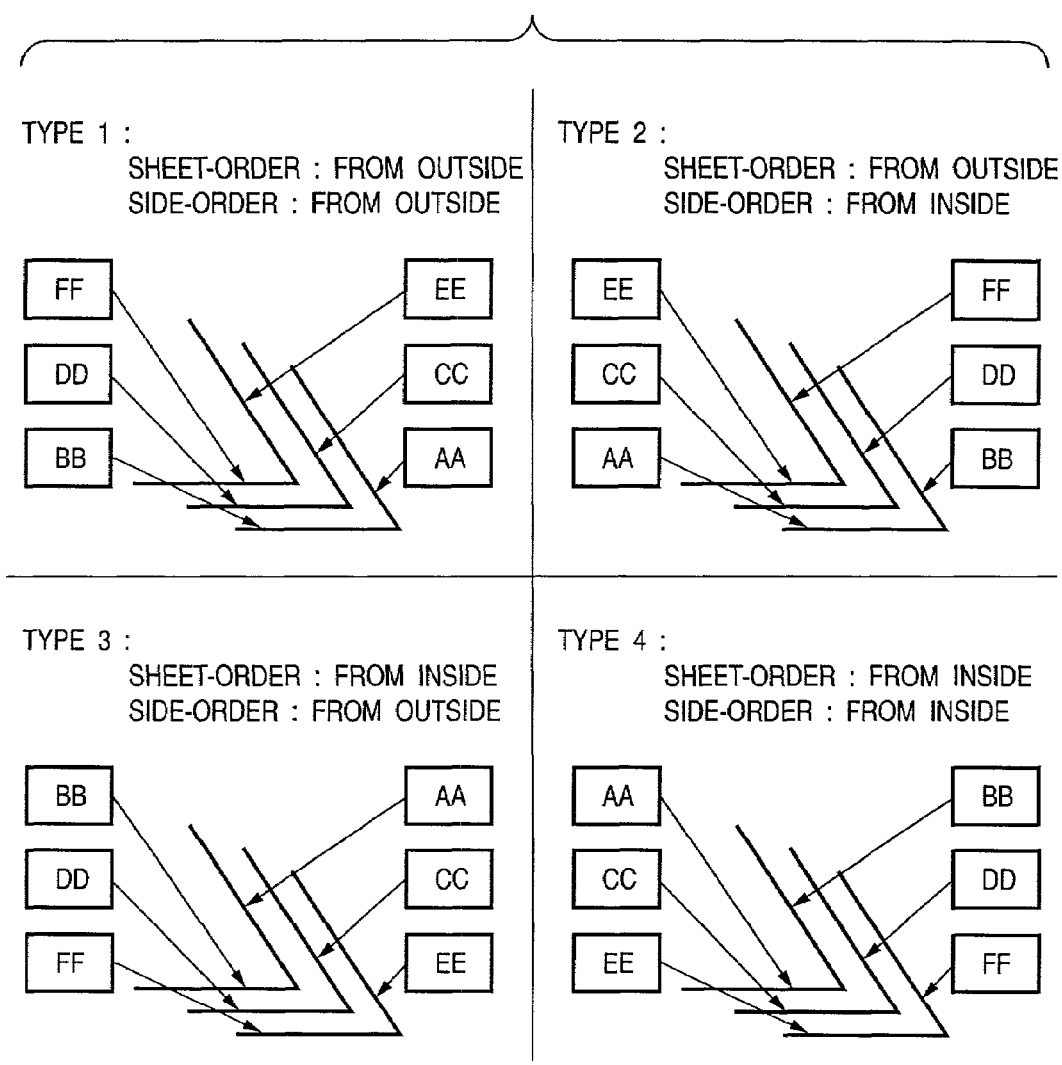
FIG. 10 is an explanatory view of printer types discriminated based on side-order and sheet-order settings.

As shown in FIG. 9, 12 pages of data is laid out by 2 pages on respective sides of print sheets, and the data for 6 sides is transmitted from the top data with designation of double-sided printing. Note that for the sake of simplification, page layout processing is not described here. In the case of transmitting in this order, the output results are classified into 4 types based on printer type, paper discharge orifice or finisher type, as shown in FIG. 10. That is, the classification is made by combination of the designation of the "sheet-order setting" to designate whether an initial page "AA" is to be printed on the outmost side sheet or the innermost side sheet, and the "side-order setting" to designate whether a side where the page "AA" is printed is an inner side or outer side of the sheet. The printer driver 203 controls book bind printing in consideration of the transmission order of data constructing each batch document by designating a printer type from the 4 patterns. These settings may be made by the printer driver 203 internally based on data held inside the printer driver 203 as printer properties, and the user is not required to make such settings.

Next, the batch-order setting information 604 in FIG. 6 is a parameter, which is effective when the binding setting is to output plural batch documents, indicates the transmission order of batch documents. The parameter designates whether the batch documents are to be sent from a head batch document (ascending order) or from a last batch document (descending order). The value of "batch-order setting" parameter is determined by finisher property that determines sides of respective batch documents to be brought into contact with each other, upon execution of saddle stitching and two-folding. Accordingly, the value is set by the printer driver 203 internally, and the user is not required to set the value.

Figure 11A:
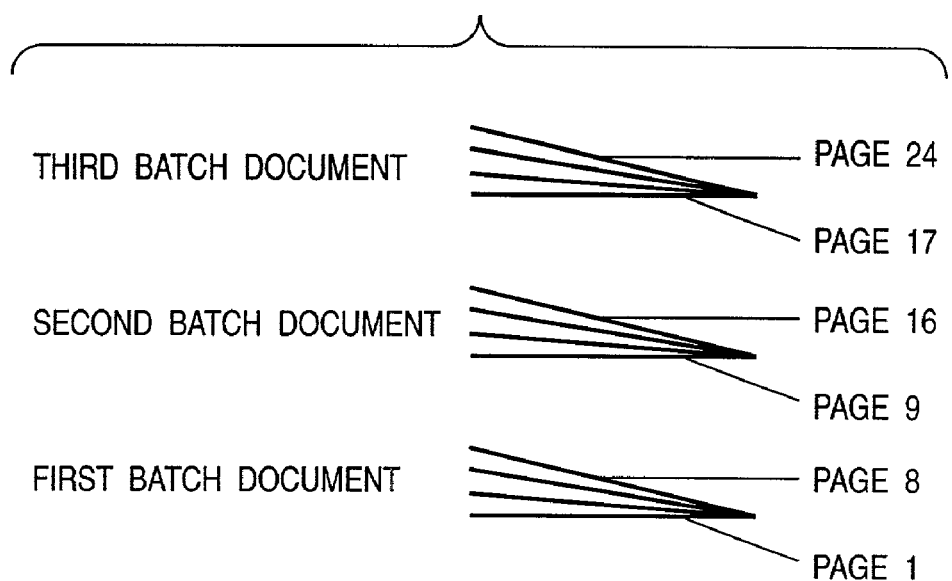
FIGS. 11A and 11B are explanatory views showing the difference of output results by different batch-order settings.
Figure 11B:
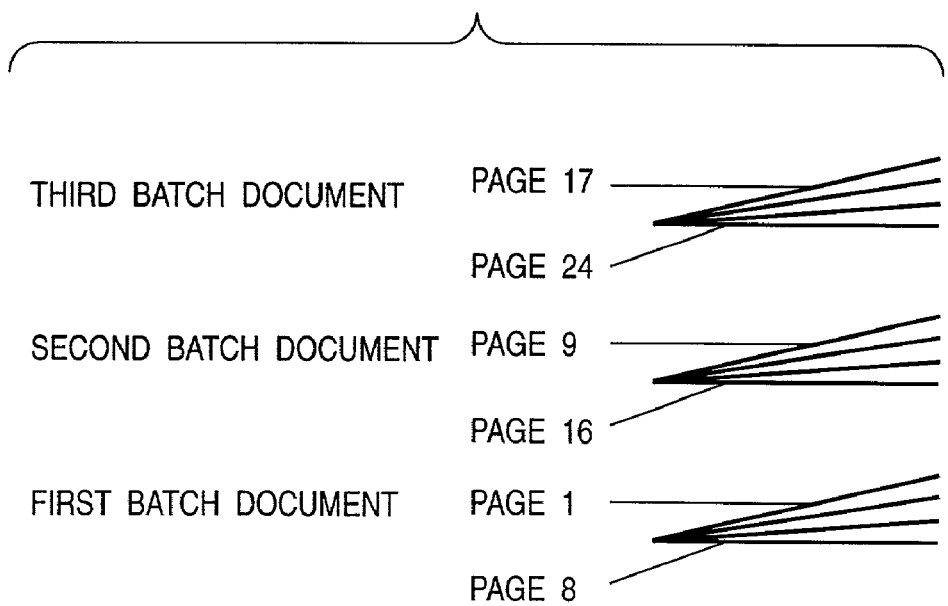

If the data, to be book bind printed as a leftward-opened book, is transmitted in the ascending order, the last page of one batch document and the initial page of the next batch document may be printed on the same side of print sheet, as shown in FIG. 11A, or may be printed on different print sheets, as shown in FIG. 11B. Further, if the opening direction of the output result is reversed, the result is reversed. That is, the printer driver 203 obtains identification information of saddle stitch finisher currently attached to the printing apparatus by Dynamic Config inquiry (direct acquisition of information from the printing apparatus by bidirectional communication), and specifies one of plural saddle stitch finisher properties previously provided in the printer driver corresponding to the obtained identification information. Then the printer driver 203 determines the batch-order setting for transmitting the batch documents to the printer in consideration of the specified finisher property and the opening direction setting designated by the user via the user interface, and upon book bind printing by printing plural batch documents, controls the order of the respective batch documents.

Note that in the above example, the printer driver 203 sets the transmitting order of the batch documents from the finisher property and the opening direction, however, it may be arranged such that the printer driver 203 simply provides only the finisher property as book binding setting, and the spool file manager 304 side controls the transmission order of batch documents in consideration of the property information of the saddle stitch finisher provided from the printer driver 203 and the opening direction set via the user interface.

In this manner, when book bind printing by printing plural batch documents is designated, as the printer driver 203 (spool file manager 304) controls the order of transmitting the batch documents, the user obtains a final bound printed material without changing the direction of each batch document discharged to the finisher (paper discharge unit) of the printing apparatus.

The setting information related to book bind printing as shown in FIG. 6 is generated by the printer driver 203 from information obtained from the user interface and model property information held inside the driver, and stored into the spool file 303 via the spooler 302. That is, the setting information related to book bind printing is generated by the printer driver 203 by obtaining information on the opening direction designated by the user from the user interface (note that the opening direction may be obtained and determined by the spool file manager), further, model information of the currently-selected printing apparatus as an output destination (this information indicates the paper discharge direction by limitation of stitching mechanism), and saddle stitch finisher property if connected to the printing apparatus capable of using plural saddle stitch finishers.

Figure 12:
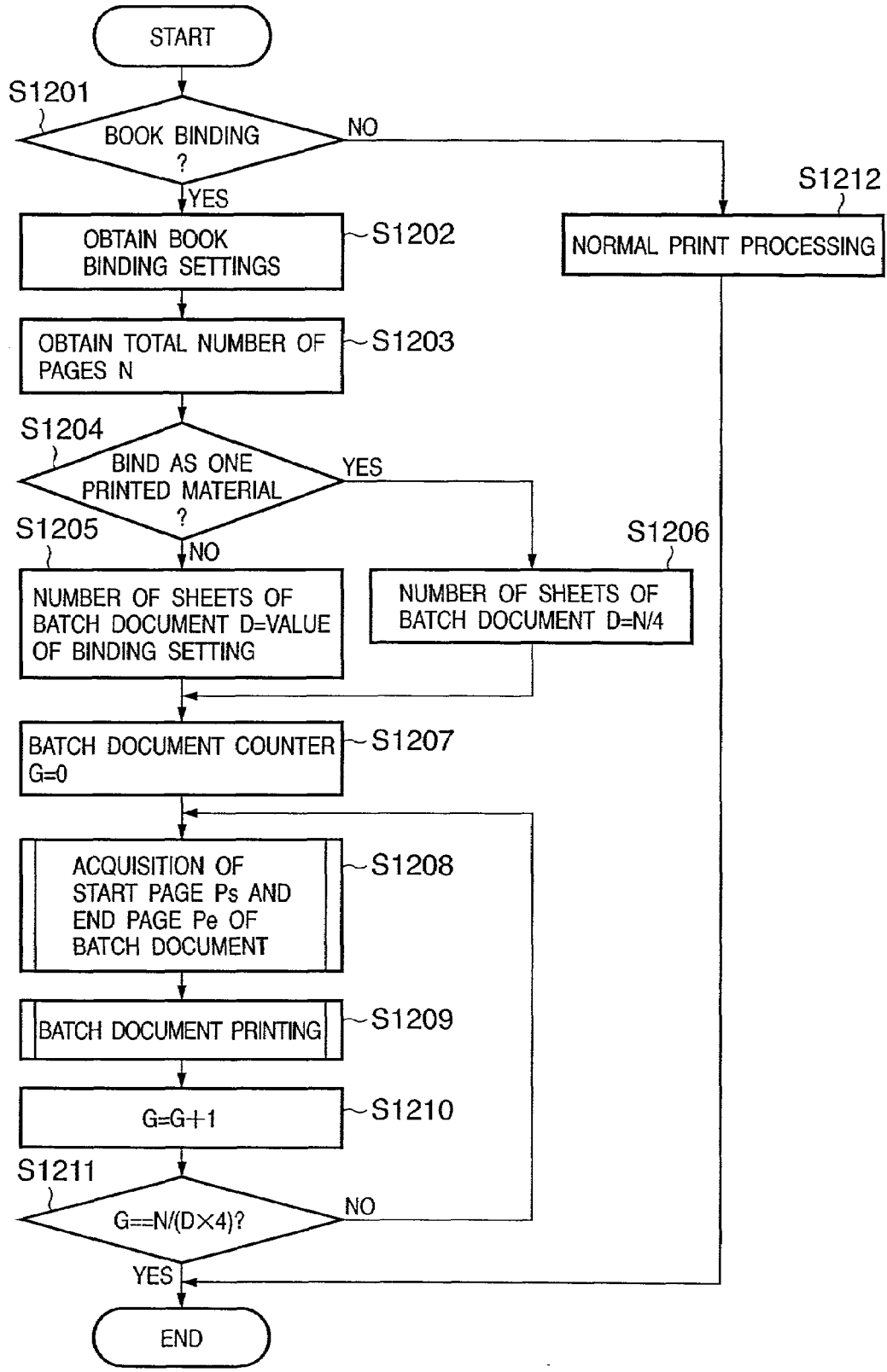
FIG. 12 is a flowchart showing processing of book bind printing by a spool manager 304.

FIG. 12 is a flowchart showing processing of book bind printing by the spool manager 304. In the following description, the processing is performed by the spool file manager 304, however, as the spool file manager 304 is a program module, the processing is actually realized by the CPU 1 of the host computer 3000 based on the program module. First, at step S1201, if book bind printing is not designated as a printing method, the process proceeds to step S1212, at which normal print processing is performed. If book bind printing is designated, the process proceeds to step S1202, at which the CPU 1 obtains setting information related to book bind printing as shown in FIG. 6 from the spool file 303 based on a setting information acquisition module included in the print control program of the present invention.

Next, at step S1203, the CPU 1 performs processing to obtain the total number of pages N in the book bind printing based on a total number of pages acquisition module (a part of functions of the spool file manager 304) of the print control program. The total number of pages N is obtained by detecting that the spooler 302 has recorded data of all the pages in the spool file 303 and print processing by the application 201 has been completed and by message-notifying the spool file manger 304 of the detected result.

Note that in the present embodiment, the data of all the pages to be book bind printed is obtained, however, it may be arranged such that book bind printing is sequentially performed at timing of acquisition of page data in batch document units, in sheet units, or in side units.

Next, at steps S1204 to S1206, the CPU 1 obtains the number of sheets D constructing one batch document based on the spool file manager module. In case of book binding to one bound printed material, the number is obtained as N/4 using the total number of pages N obtained at step S1203. In case of book binding by printing plural batch documents, as the value of binding setting indicates the number of sheets constructing each batch document, the value is the number of sheets D.

At step S1207, the CPU 1 initializes a variable G as a counter for repeating processing at step S1208 and the subsequent steps based on an initialization module included in the print control program. The variable G indicates the number of print-processed batch documents. The value of the variable is incremented at step S1210 when print processing for one batch document has been completed from step S1208 to step S1209, and compared with the total number of batch documents (N/(D×4)). The processing at steps S1208 to S1209 is repeated until print processing of all the batch documents has been completed.

At step S1208, the CPU 1 performs processing to obtain a start page Ps and an end page Pe of batch document subjected to generation processing of printing data at the subsequent step S1209, based on a page setting module included in the print control program.

Figure 13:
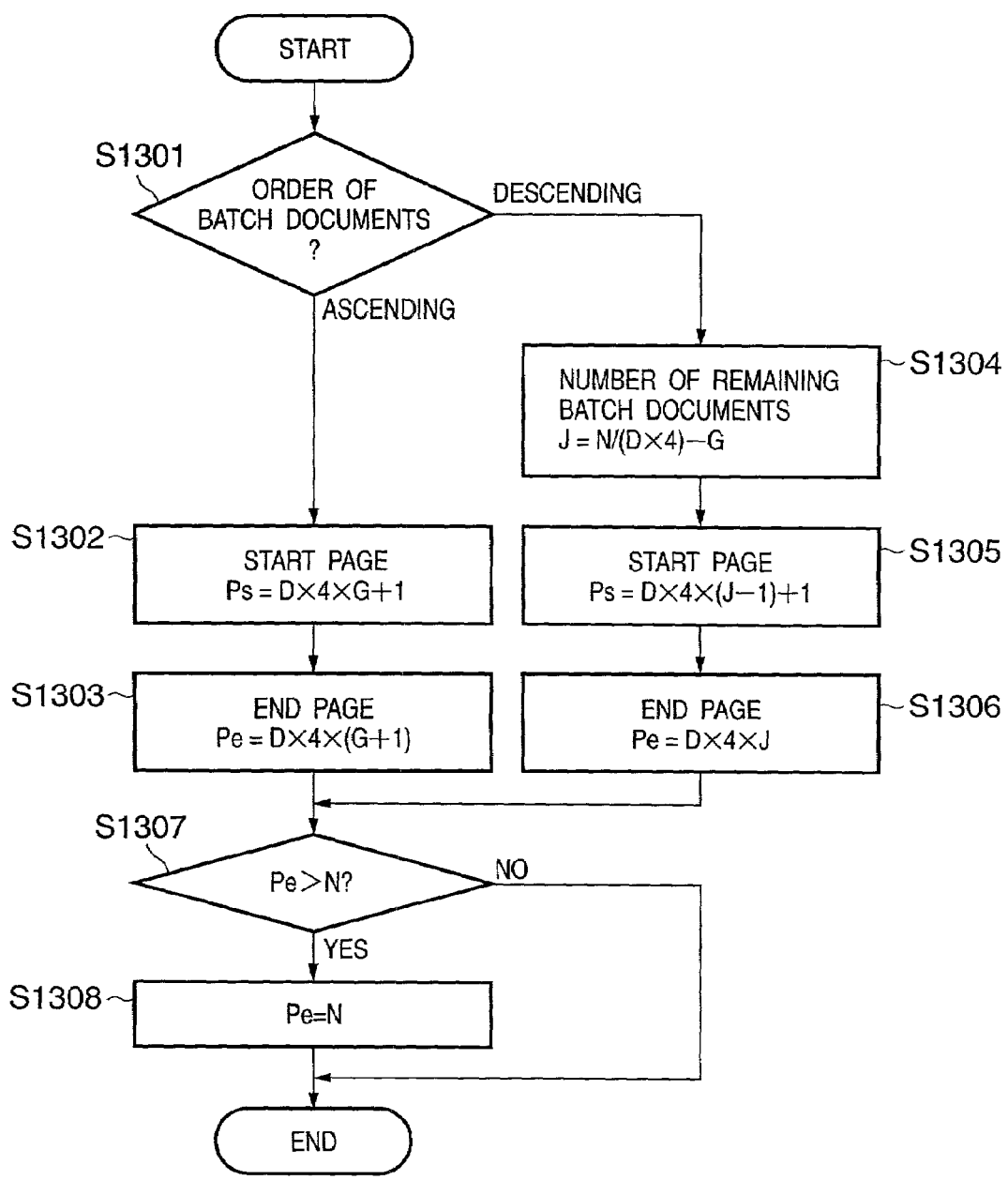
FIG. 13 is a flowchart showing processing to obtain a start page and an end page of batch document.

FIG. 13 is a flowchart showing processing to obtain the start page and the end page of batch document at step S1208 in FIG. 12.

At step S1301, the CPU 1 examines the batch-order information 604 included in the settings of book bind printing as shown in FIG. 6, based on the print control program.

If the ascending order (parameter: 0) is designated as the order of batch documents, the process proceeds to step S1302, at which the variable Ps indicating the start page of currently-processed batch document is obtained. In case of ascending order, as the number of pages of already-printed batch document is (D×4×G), the number obtained by adding 1 to the above number is the start page number. Next, at step S1303, the variable Pe indicating the end page which can be arranged in the current batch document is obtained. As this value is the number of all the pages to the current batch document, the value is obtained by (D×4×(G+1)). The obtained value is temporarily determined as the variable Pe indicating the end page of batch document.

On the other hand, if the descending order (parameter: 1) is designated as the order of the batch document, the process proceeds to step S1304, at which the CPU 1 obtains a variable J indicating the number of unprinted batch documents including the currently-processed batch document. The variable is obtained by subtracting the value G indicating the number of printed batch documents from the total number of batch documents N/(D×4). At step S1305, the CPU 1 obtains the start page Ps of the current batch document based on the print control program. In the case where the descending order is designated as the order of the batch documents, as the last one of the remaining batch documents is the processed batch document, a value, obtained by adding 1 to the number of pages of all the remaining batch documents except the last batch document (D×4×(J−1)), is the start page Ps. Next, at step S1306, the CPU 1 obtains the end page which can be arranged in the current batch document based on the print control program. As the end page is the number of all the pages of unprinted batch documents including the current batch document, the value is obtained by (D×4×J). This value is temporarily determined as the variable Pe indicating the end page of the batch document.

When the above-described start page and end page are obtained, the process proceeds to step S1307, at which it is determined whether or not the value of the end page Pe is over the total number of pages N. If the end page value is over the total number of pages, the process proceeds to step S1308, at which the CPU 1 sets the value Pe to the total number of pages N. In this manner, the start page and the end page of batch documents are obtained in accordance with the ascending/descending order designated as the order of batch documents. Accordingly, in the case where the book bind printing by printing plural batch documents is performed, printing can be performed in ascending or descending order as the order of batch documents in accordance with the batch-order setting from the printer driver 203 (included in the print control program of the present invention).

Next, the details of step S1209 for print processing for one batch document will be described.

Figure 14:
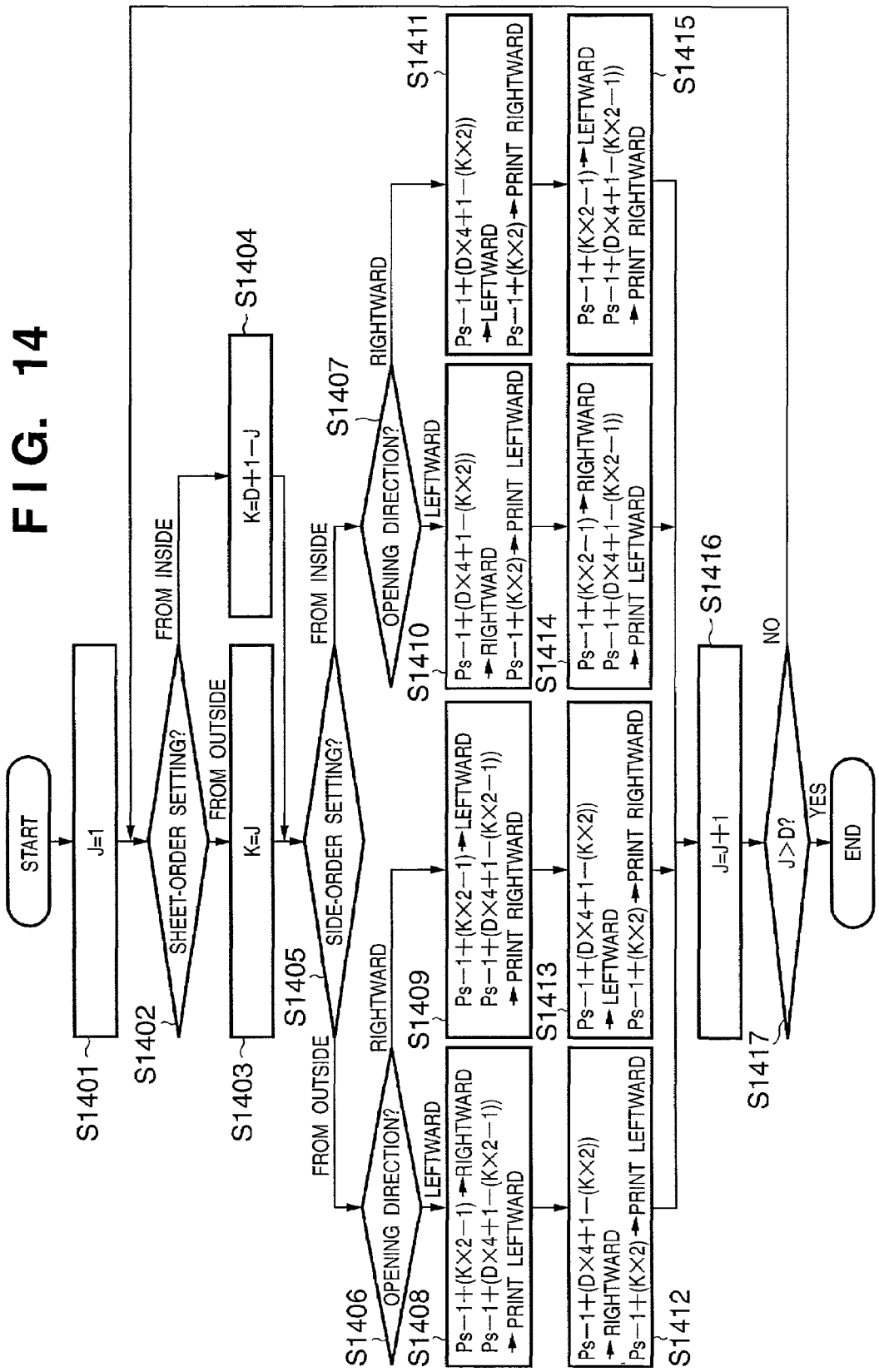
FIG. 14 is a flowchart showing batch document print processing.

FIG. 14 is a flowchart showing the generation processing of printing data for one batch document at step S1209 in FIG. 12. First, at step S1401, the CPU 1 initializes the variable J of a paper counter that counts the number of sheets constructing the batch document, indicating the currently-processed sheet, to "1". Note that the variable J is incremented at step S1416, and at step S1417, compared by the CPU 1 with the value D indicating the number of sheets constructing the batch document, obtained at step S1205 or S1206. Processing at step S1402 and the subsequent steps is repeated by the number of sheets constructing the batch document.

Next, at step S1402, the CPU 1 examines the sheet-order setting information 602 included in the settings of book bind printing in FIG. 6, based on the print control program. If printing from the outside (parameter: 1) is designated as the order of sheets, the process proceeds to step S1403, at which a variable K, indicating the order of currently-processed sheet from the outside, is set to the value of the variable J. Further, if printing from the inside (parameter: 0) is designated as the order of sheets, the process proceeds to step S1404, at which the CPU 1 sets the variable K to a value obtained by (D+1−J). Accordingly, if printing is performed from the outside of batch document, the value of the variable K is sequentially increases from 1 to the number of sheets D, while if printing is performed from the inside of batch document, the value of the variable K is sequentially decreases from the number of sheets D to 1.

Next, at steps S1405 to S1407, the process branches to four patterns of processings based on the combinations of the side-order setting information 601 and the opening direction setting information 605 included in the settings of book bind printing in FIG. 6. The side-order setting information is set based on designation inputted by the user using a property image (user interface) provided by the printer driver. That is, if the CPU 1 determines that printing from the outside (parameter: 1) is designated as the order of sides and the leftward-opening (parameter: 0) is designated as the opening direction, the process proceeds to step S1408, while if the CPU 1 determines that the rightward-opening (parameter: 1) is designated, the process proceeds to step S1409. On the other hand, if the CPU 1 determines that printing from the inside (parameter: 0) is designated as the order of sides and the leftward-opening (parameter: 0) is designated as the opening direction, the process proceeds to step S1410, while if the CPU 1 determined that the rightward-opening (parameter: 1) is designated, the process proceeds to step S1411. At steps S1408 to S1411, print processing is performed on the first side of sheet in accordance with the respective patterns, and at steps S1412 to S1415, print processing is performed on the second side.

FIGS. 15A and 15B are an example of setting and an explanatory view of pages laid out on paper. Note that the pages printed in form of batch document are the start page Ps to the end page Pe obtained at step S1208 in FIG. 12, and the number of sheets constructing the batch document corresponds to the value D obtained at step S1205 or S1206 in FIG. 12. Using these values, 4 pages printed on the K-th sheet from the outside of the batch document are represented as:

a: (Ps−1+(K×2−1)) page
b: (Ps−1+(K×2)) page
c: (Ps−1+(D×4+1−(K×2−1))) page
d: (Ps−1+(D×4+1−(K×2)) page That is, pages b and d are printed on the same side, and the page b is printed on the back of the page a, and the page d is printed on the back of the page c. These relations are always established regardless of the sheet-order setting, the side-order setting and the opening direction setting. Considering that in book bind printing, a value obtained by adding the page numbers of pages laid out on one side of sheet is constant and that the page number on the rear side and the page number on the front side are consecutive, the relations among these 4 pages can be easily understood.

At step S1405 in FIG. 14, processing is selected by the determination of the CPU 1 of the setting of side from which printing is started. That is, if the CPU 1 determines that the printing is to be made based on Type 1 or Type 3 as shown in FIG. 10, the process proceeds to step S1406, while if the CPU 1 determines that the printing is made based on Type 2 or Type 4, the process proceeds to step S1407.

At steps S1406 and S1407, processing is selected based on the opening direction setting. The CPU 1 determines the order of sides on which printing is performed, based on a page layout determination module of the print control program, in accordance with the side-order setting, and the CPU 1 determines positions of pages by the opening direction setting. FIG. 15B shows the result of print processing at steps S1408 to S1415. At steps S1408 and S1412, the CPU 1 performs processing to generate print data for printing on the first side and the second side in leftward-opening in the Type 1 and the Type 3, based on a generation module, and the print data transmitted to the printer are as shown in FIG. 15B. Similarly, print data generated by the print processing at steps S1409 to S1415 are as shown in FIG. 15B.

In this manner, page layout processing in book bind printing can be performed in accordance with the sheet-order setting, the side-order setting and the opening direction setting from the printer driver 203.

As described above, according to the present embodiment, page layout processing in book bind printing can be performed in correspondence with an arbitrary type of printer, in accordance with the side-order setting and the sheet-order setting based on the printer properties (double-sided printing property, finisher properties such saddle stitching, paper discharge orifice property etc.).

Accordingly, a preferable result of book bind printing can be provided by using a printer having arbitrary printer properties (double-sided printing property, finisher properties such saddle stitching, paper discharge orifice property etc.).

Note that the present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium storing software program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiment, and the storage medium storing the program code constitutes the invention.

Further, the storage medium, such as a floppy disk, a hard disk, an optical disk, a magneto-optical disk, a CD-ROM, a CD-R, a magnetic tape, a non-volatile type memory card, and a ROM can be used for providing the program code.

Furthermore, besides aforesaid functions according to the above embodiment are realized by executing the program code which is read by a computer, the present invention includes a case where an OS (operating system) or the like working on the computer performs a part or entire processes in accordance with designations of the program code and realizes functions according to the above embodiment.

Furthermore, the present invention also includes a case where, after the program code read from the storage medium is written in a function expansion board which is inserted into the computer or in a memory provided in a function expansion unit which is connected to the computer, CPU or the like contained in the function expansion board or unit performs a part or entire process in accordance with designations of the program code and realizes functions of the above embodiment.

As described above, according to the present embodiment, optimum page layout processing in book bind printing can be performed in correspondence with the properties of output apparatus capable of book bind printing.

Further, when book bind printing is performed by printing plural batch documents, the order of batch documents can be controlled such that pages of the plural batch documents are arrayed in ascending order, in accordance with batch-order setting based on the printer properties (double-sided printing property, finisher properties such saddle stitching, paper discharge orifice property etc.) and the opening direction setting of book binding. Thus the system affords improved convenience to the user.

As many apparently widely different embodiments of the present invention can be made without departing from the spirit and scope thereof, it is to be understood that the invention is not limited to the specific embodiments thereof except as defined in the appended claims.

What is claimed is:

1. A print control apparatus for generating print data to be printed by a printing apparatus such that a folding process for print sheets printed by the printing apparatus is performed by a finishing apparatus, the print control apparatus comprising:
    setting information acquisition means for acquiring setting information including side-order setting information and sheet-order setting information in accordance with properties of the printing apparatus and finishing apparatus;
    page layout determination means for specifying an order of a print side to be printed by the printing apparatus based on the setting information acquired by said setting information acquisition means and for determining a page layout of print data; and
    generation means for generating the print data in accordance with the page layout determined by said page layout determination means,
    wherein the side-order setting information is information designating whether the print side to be printed prior is an inner side or an outer side of a print sheet by the folding process, and the sheet-order setting information is information designating whether the print sheet to be printed prior is an outmost side sheet or an innermost side sheet by the folding process.

2. The print control apparatus according to claim 1, wherein said setting information includes at least the side-order setting information and the sheet-order setting information, and wherein said setting information is stored as a file for a printer driver in a memory device.

3. The print control apparatus according to claim 1, wherein said setting information acquisition means acquires said sheet-order setting information and said side-order setting information from the type of said output apparatus or used paper discharge orifice and the type of finisher.

4. A print control apparatus for generating print data to be printed by a printing apparatus such that a folding process for print sheets printed by the printing apparatus is performed by a plurality of saddle-stitch finishing apparatuses, which are interchangeably attachable to the printing apparatus, the print control apparatus comprising:
    layout control means for, if the print sheets printed by the printing apparatus are divided into a plurality of batch documents and the folding process for each batch document is performed by one of the plurality of saddle-stitch finishing apparatuses, which is currently attached to the printing apparatus controlling a layout of each page to arrange pages in consecutive page numbers for each batch document;
    acquisition means for acquiring identification information of the saddle-stitch finishing apparatus, which is attached to the printing apparatus;
    specification means for specifying a paper discharge property corresponding to the identification information acquired by said acquisition means, from a plurality of paper discharge properties; and
    transmission order control means for controlling an order of transmission of print data by each batch document based on a specified paper discharge property.

5. The print control apparatus according to claim 4, wherein said transmission order control means controls the order of transmission of print data by each batch document based on designation of opening direction of book binding.

6. The print control apparatus according to claim 5, wherein said opening direction of book binding is included in print settings designated by a user via a user interface, and wherein paper discharge property in said output apparatus is previously determined for each output apparatus.

7. A print control method for generating print data to be printed by a printing apparatus such that a folding process for print sheets printed by the printing apparatus is performed by a finishing apparatus, the print control method comprising:
    a setting information acquisition step of acquiring setting information including side-order setting information and sheet-order setting information in accordance with properties of the printing apparatus and finishing apparatus;
    a page layout determination step of specifying an order of a print side to be printed by the printing apparatus based on the setting information acquired at said setting information acquisition step and of determining a page layout of print data; and
    a generation step of generating the print data in accordance with the page layout determined at said page layout determination step,
    wherein the side-order setting information is information designating whether the print side to be printed prior is an inner side or an outer side of a print sheet by the folding process, and the sheet-order setting information is information designating whether the print sheet to be printed prior is an outmost side sheet or an innermost side sheet by the folding process.

8. The print control method according to claim 7, wherein said setting information includes at least the side-order setting information and the sheet-order setting information, and wherein said setting information is stored as a file for a printer driver in a memory device.

9. The print control method according to claim 7, wherein at said setting information acquisition step, said sheet-order setting information and said side-order setting information are acquired from the type of said output apparatus or used paper discharge orifice and the type of finisher.

10. A print control method for generating print data to be printed by a printing apparatus such that a folding process for print sheets printed by the printing apparatus is performed by a plurality of saddle-stitch finishing apparatus, which are interchangeably attachable to the printing apparatus, the print control method comprising:
a layout control step of, if the print sheets printed by the printing apparatus are divided into a plurality of batch documents and the folding process for each batch document is performed by a finishing apparatus, which is currently attached to the printing apparatus, controlling a layout of each page to arrange pages in consecutive page numbers for each batch document;
an acquisition step of acquiring identification information of the finishing saddle-stitch apparatus, which is attached to the printing apparatus; and
a specification step for specifying a paper discharge property corresponding to the identification information acquired in said acquisition step, from a plurality of paper discharge properties; and
a transmission order control step of controlling an order of transmission of print data by each batch document based on a specified paper discharge property.

11. The print control method according to claim 10, wherein at said transmission order control step, the order of transmission of print data by each batch document is controlled based on designation of opening direction of book binding.

12. The print control method according to claim 11, wherein said opening direction of book binding is included in print settings designated by a user via a user interface, and wherein paper discharge property in said output apparatus is previously determined for each output apparatus.

13. A computer readable medium storing a program for causing a computer to execute a print control method for generating print data to be printed by a printing apparatus such that a folding process for print sheets printed by the printing apparatus is performed by a finishing apparatus, the method comprising:
a setting information acquisition step of acquiring setting information including side-order setting information and sheet-order setting information in accordance with properties of the printing apparatus and finishing apparatus;
a page layout determination step of specifying an order of a print side to be printed by the printing apparatus based on the setting information acquired at said setting information acquisition step and of determining a page layout of print data; and
a generation step of generating the print data in accordance with the page layout determined at said page layout determination step,
wherein the side-order setting information is information designating whether the print side to be printed prior is an inner side or an outer side of the print sheet by the folding process, and the sheet-order setting information is information designating whether a print sheet to be printed prior is an outermost side sheet or an innermost side sheet by the folding process.

14. The computer readable medium according to claim 13, wherein the setting information includes at least the side-order setting information and the sheet-order setting information, and wherein the setting information is stored as a file for a printer driver in a memory device.

15. The computer readable medium according to claim 13, wherein in said setting information acquisition step, the sheet-order setting information and the side-order setting information are acquired from a type of the output apparatus or used paper discharge orifice and a type of finisher.

16. A computer readable medium storing a program for causing a computer to execute a print control method for generating print data to be printed by a printing apparatus such that a folding process for print sheets printed by the printing apparatus is performed by a plurality of saddle-stitch finishing apparatus, which are interchangeably attachable to the printing apparatus, the method comprising:
a layout control step of, if the print sheets printed by the printing apparatus are divided into a plurality of batch documents and the folding process for each batch document is performed by a finishing apparatus, which is currently attached to the printing apparatus, controlling layout of each page to arrange pages in consecutive page numbers for each batch document;
an acquisition step of acquiring identification information of the saddle-stitch finishing apparatus, which is attached to the printing apparatus, and
a specification step for specifying a paper discharge property corresponding to the identification information acquired in said acquisition step, from a plurality of paper discharge properties; and
a transmission order control step of controlling an order of transmission of print data by each batch document based on a specified paper discharge property.

17. The computer readable medium according to claim 16, wherein at said transmission order control step, the order of transmission of print data by each batch document is controlled based on a designation of an opening direction of book binding.

18. The computer readable medium according to claim 16, wherein the opening direction of book binding is included in print settings designated by a user via a user interface, and wherein a paper discharge property in the output apparatus is previously determined for each output apparatus.

19. A print control apparatus for generating print data to be print-outputted by an output apparatus, the print control apparatus comprising:
layout control means for, if book bind printing to discharge a plurality of batch documents from said output apparatus is required, controlling a layout of each page to arrange pages in consecutive page numbers for each batch document;
transmission order control means for, if book bind printing to discharge a plurality of batch documents from said output apparatus is required, controlling an order of transmission of print data by each batch document;
acquisition means for, if a plurality of saddle stitch finishers are interchangeably attachable to said output apparatus, acquiring identification information of a saddle stitch finisher, which is attached to said output apparatus; and specification means for specifying a paper discharge property corresponding to the identification information acquired by said acquisition means, from a plurality of paper discharge properties, wherein said transmission order control means controls the order of transmission of print data by each batch document based on the paper discharge property specified by said specification means.

20. A print control method for generating print data to be print-outputted by an output apparatus, the print control method comprising:

a layout control step for, if book bind printing to discharge a plurality of batch documents from the output apparatus is required, controlling a layout of each page to arrange pages in consecutive page numbers for each batch document;

a transmission order control step for, if book bind printing to discharge a plurality of batch documents from the output apparatus is required, controlling an order of transmission of print data by each batch document;

an acquisition step for, if a plurality of saddle stitch finishers are interchangeably attachable to the output apparatus, acquiring identification information of a saddle stitch finisher, which is attached to the output apparatus; and a specification step for specifying a paper discharge property corresponding to the identification information acquired in said acquisition step, from a plurality of paper discharge properties, wherein said transmission order control step controls the order of transmission of print data by each batch document based on the paper discharge property specified in said specification step.

21. A computer readable medium storing a program for causing a computer to execute a print control method for generating print data to be print-outputted by an output apparatus, the print control method comprising:

a layout control step for, if book bind printing to discharge a plurality of batch documents from said output apparatus is required, controlling a layout of each page to arrange pages in consecutive page numbers for each batch document;

a transmission order control step for, if book bind printing to discharge a plurality of batch documents from the output apparatus is required, controlling an order of transmission of print data by each batch document;

an acquisition step for, if a plurality of saddle stitch finishers are interchangeably attachable to the output apparatus, acquiring identification information of a saddle stitch finisher, which is attached to the output apparatus; and a specification step for specifying a paper discharge property corresponding to the identification information acquired in said acquisition step, from a plurality of paper discharge properties, wherein said transmission order control step controls the order of transmission of print data by each batch document based on the paper discharge property specified in said specification step.

* * * * *

UNITED STATES PATENT AND TRADEMARK OFFICE
CERTIFICATE OF CORRECTION

PATENT NO. : 7,031,001 B2
APPLICATION NO. : 09/912553
DATED : April 18, 2006
INVENTOR(S) : Koji Nakagiri et al.

It is certified that error appears in the above-identified patent and that said Letters Patent is hereby corrected as shown below:

COLUMN 1
        Line 16, "printer" should read --printer,--;
        Line 32, "outside," should read --outside;--; and
        Line 64, "has its" should read --has as its--.

COLUMN 2
        Line 11, "has an" should read --has as an--.

COLUMN 3
        Line 17, "present" should read --the present--; and
        Line 18, "system" should read --a system--.

COLUMN 4
        Line 33, "are stored" should read --is stored--; and
        Line 36, "where" should read --wherein--.

COLUMN 5
        Line 4, "spooler 203" should read --spooler 204--; and
        Line 16, "execution" should read --execution,--.

COLUMN 7
        Line 14, "utilized," should read --utilized;--;
        Line 21, "in case" should read --in the case--;
        Line 63, "used," should read --used;--; and
        Line 66, "document," should read --document;--.

COLUMN 8
        Line 3, "to e.g." should read --to, e.g.,--;
        Line 21, "outmost" should read --outermost--;
        Line 33, "indicates" should read --and which indicates--; and
        Line 67, "direction," should read --direction;--.

COLUMN 9
        Line 24, "manager," should read --manager;--;
        Line 25, "currently-selected" should read --currently selected--;
        Line 33, "304," (first occurrence) should read --304;--;
        Line 52, "manger" should read --manager--;
        Line 54, "obtained," should read --obtained;--;
        Line 61, "In case" should read --In the case--; and
        Line 64, "case" should read --the case--.

UNITED STATES PATENT AND TRADEMARK OFFICE
CERTIFICATE OF CORRECTION

PATENT NO. : 7,031,001 B2
APPLICATION NO. : 09/912553
DATED : April 18, 2006
INVENTOR(S) : Koji Nakagiri et al.

It is certified that error appears in the above-identified patent and that said Letters Patent is hereby corrected as shown below:

COLUMN 10
    Line 27, "In case" should read --In the case--; and
    Line 47, "where" should read --wherein--.

COLUMN 11
    Line 2, "where" should read --wherein--;
    Line 34, "increases" should read --increased--;
    Line 37, "decreases" should read --decreased--;
    Line 55, "determined" should read --determines--;
    Line 58, "sheet" should read --sheets--; and
    Line 64, "form" should read --the form--.

COLUMN 12
    Line 49, "such" should read --such as--; and
    Line 54, "such" should read --such as--.

COLUMN 13
    Line 9, "besides" should read --besides that--;
    Line 12, "where" should read --wherein--;
    Line 17, "where," should read --wherein,--; and
    Line 34, "such" should read --such as--.

COLUMN 14
    Line 1, "outmost" should read --outermost--.

COLUMN 15
    Line 2, "outmost" should read --outermost--.

Signed and Sealed this

Twenty-first Day of November, 2006

JON W. DUDAS
*Director of the United States Patent and Trademark Office*